(12) United States Patent
Gabriel et al.

(10) Patent No.: US 9,677,487 B2
(45) Date of Patent: Jun. 13, 2017

(54) METHOD AND SYSTEM FOR SELECTING FUEL OCTANE

(71) Applicant: Ford Global Technologies, LLC, Dearborn, MI (US)

(72) Inventors: David Crist Gabriel, Troy, MI (US); Christopher Alan Lear, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 14/677,318

(22) Filed: Apr. 2, 2015

(65) Prior Publication Data

US 2016/0290265 A1  Oct. 6, 2016

(51) Int. Cl.
| | |
|---|---|
| F02D 41/00 | (2006.01) |
| F02D 41/02 | (2006.01) |
| F02D 41/14 | (2006.01) |
| F02P 5/152 | (2006.01) |
| G01C 21/36 | (2006.01) |

(52) U.S. Cl.
CPC ....... *F02D 41/021* (2013.01); *F02D 41/1406* (2013.01); *F02P 5/1527* (2013.01); *G01C 21/3697* (2013.01); *F02D 41/0025* (2013.01); *F02D 2200/0625* (2013.01)

(58) Field of Classification Search
CPC .. F02D 41/1401; F02D 41/1406; G01C 21/36
USPC ....................................................... 701/104
See application file for complete search history.

(56) References Cited

U.S. PATENT DOCUMENTS

| | | | |
|---|---|---|---|
| 7,367,312 | B1 | 5/2008 | Boyer et al. |
| 7,890,241 | B2 | 2/2011 | Russell |
| 8,096,283 | B2 | 1/2012 | Surnilla et al. |
| 8,127,745 | B2 | 3/2012 | Surnilla et al. |
| 8,165,780 | B2 | 4/2012 | Russell |
| 8,267,066 | B2 | 9/2012 | Surnilla et al. |
| 8,315,755 | B2 | 11/2012 | Hirata et al. |
| 8,315,788 | B2 | 11/2012 | Surnilla et al. |
| 8,352,162 | B2 | 1/2013 | Leone et al. |
| 8,554,445 | B2 | 10/2013 | Leone |
| 2008/0080682 | A1* | 4/2008 | Ogunwale .............. G06Q 30/02 379/93.17 |
| 2009/0109022 | A1* | 4/2009 | Gangopadhyay .. G01C 21/3679 340/540 |
| 2009/0255508 | A1 | 10/2009 | Cheiky |
| 2011/0015856 | A1* | 1/2011 | Arnold ............... G01C 21/3611 701/533 |
| 2011/0174267 | A1 | 7/2011 | Surnilla et al. |
| 2014/0200793 | A1* | 7/2014 | Dufford .................... G01F 9/02 701/103 |

(Continued)

OTHER PUBLICATIONS

Glauber, S. et al. "Methods and Systems for Powertrain Control," U.S. Appl. No. 14/613,771, filed Feb. 2, 2015, 36 pages.

*Primary Examiner* — Mahmoud Gimie
(74) *Attorney, Agent, or Firm* — Julia Voutyras; McCoy Russell LLP (57) ABSTRACT

Methods and systems are presented for providing information to a vehicle driver allows the driver to make an informed decision regarding selecting higher or lower octane fuel to operate the vehicle. In one example, the driver is presented fuel cost per unit distance traveled based on operating the vehicle on higher octane fuel and lower octane fuel.

20 Claims, 7 Drawing Sheets

(56) References Cited

U.S. PATENT DOCUMENTS

2015/0106001 A1* 4/2015 Lee .................... G01C 21/3469
701/123

* cited by examiner

METHOD AND SYSTEM FOR SELECTING FUEL OCTANE

FIELD

The present description relates generally to methods and systems for displaying fuel octane options to a driver of a vehicle so that the driver may make a more informed fuel selection.

BACKGROUND/SUMMARY

Gasoline fuel may be sold a variety of different octane levels. Higher octane fuels tend to be more knock resistant than lower octane fuels. Knock is a pinging sound produced by an engine and caused by a rapid pressure rise in a cylinder that results from ignition of end gases in the cylinder by way of increased temperatures and pressures in the cylinder due to a flame front produced via spark ignition progressing across the cylinder. Knock may cause engine degradation and is often discouraged at higher intensity levels. Knock may more often occur at higher engine speeds and torques since cylinder wall temperatures and cylinder air-fuel mixture temperatures may increase at higher engine speeds and torques. Engine compression ratio may also affect an engine's propensity for knock. For example, an engine having a higher compression ratio may be more prone to knock than an engine having a lower compression ratio. Higher octane fuel may be recommended by a vehicle manufacturer to reduce the possibility of knock in some vehicles, but the higher octane fuel may increase vehicle operating expense since higher octane fuel is often more expensive than lower octane fuel. Nevertheless, if the vehicle is not operated at higher engine speeds and torques, the increased cost of higher octane fuel may be unwarranted because the vehicle may not knock at lower speeds and torques.

The inventors herein have recognized the above-mentioned issue and have developed a vehicle method, comprising: retrieving engine operating information from sensors; at a substantially same time, estimating cost per unit distance traveled via a vehicle for a higher octane fuel and a lower octane fuel based on the engine operating information; and displaying cost per unit distance traveled by the vehicle for the higher octane fuel and the lower octane fuel at a same time.

By retrieving past or future vehicle information and estimating a cost per unit distance traveled by a vehicle for lower and higher octane fuels, it may be possible to provide the technical result of reducing vehicle operating cost while at the same time reducing a possibility of engine knock. For example, engine speed values, torque values, and time spent at the speeds and torques over a driving route may be stored to memory or estimated based on road speed limit. The engine torque values and speed values index brake specific fuel consumption (BFSC) functions or tables for higher and lower octane fuels that output fuel consumed per unit time (e.g., gallons/hour or liters/hour) at the particular speed and torque values. The table outputs are multiplied by the time the engine operates at the particular engine speed and torque to determine the amounts of fuel consumed if the engine were operated with higher octane fuel and lower octane fuel. The amounts of higher and lower octane fuel estimated consumed is multiplied by the cost per unit volume of fuel (e.g., $4.00/gallon) to provide the estimated cost of fuel consumed to travel the route. The estimated cost of higher and lower octane fuel consumed to travel the route is divided by the distance of the travel route to determine fuel costs per unit travel distance for lower and higher octane fuels. The estimated fuel cost to operate the vehicle over the travel route for the higher and lower octane fuel may be displayed to a driver or used as a basis for a vehicle controller to select a fuel from a fuel pump. In this way, a driver or vehicle controller may be presented with information to make an informed fuel octane selection.

The present description may provide several advantages. For example, the approach may reduce a vehicle's operating cost. Additionally, the approach may provide an indication to a driver that engine knock may be encountered over a driving route if lower octane fuel is supplied to the vehicle. Further, the approach may take present weather and future weather into consideration when determining cost to operate the vehicle with higher and lower octane fuels.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
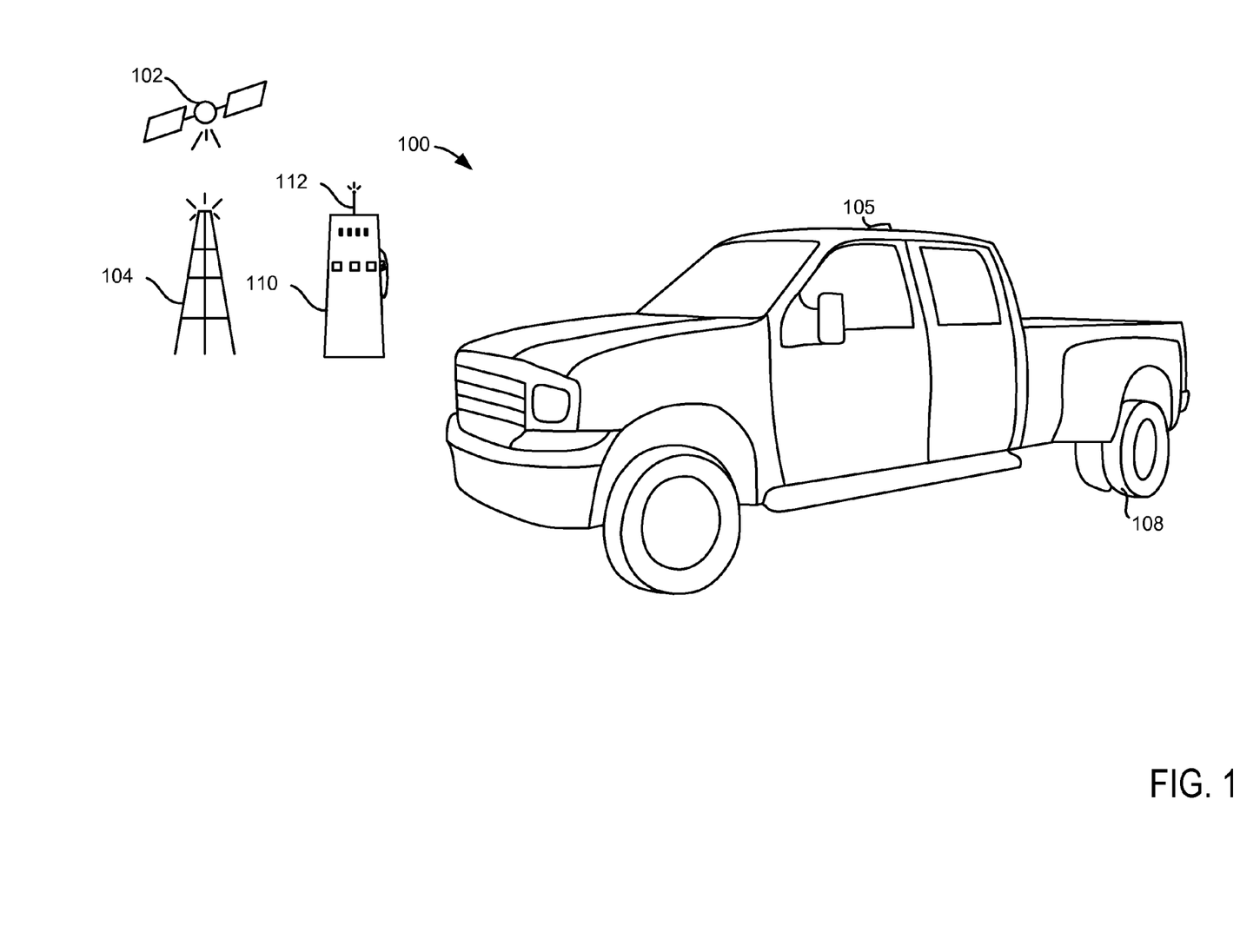
FIG. 1 shows an example vehicle that may be included in the systems and methods described herein.
Figure 2A:
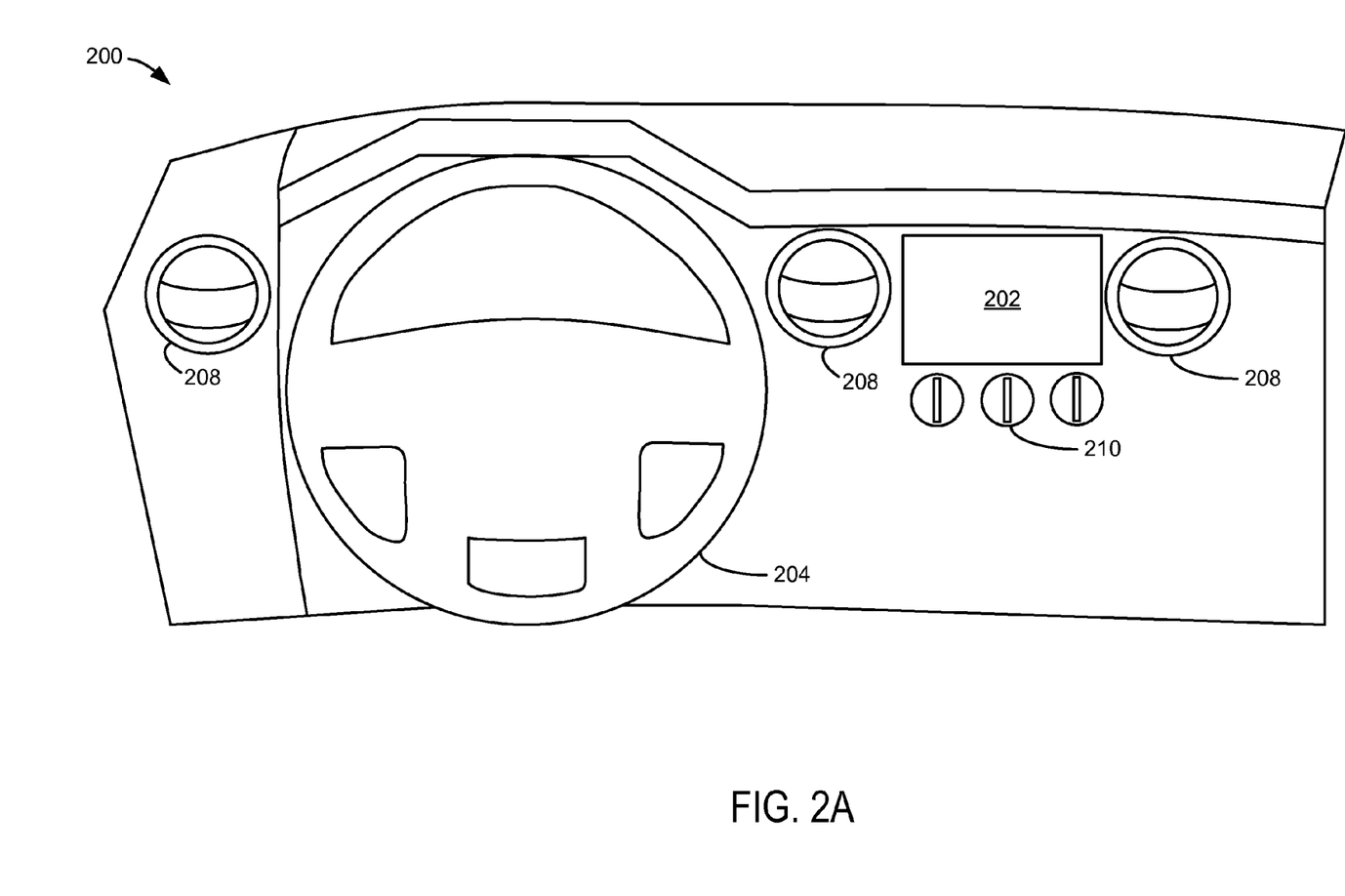
FIG. 2A shows an example vehicle instrument panel with driver display.
Figure 2B:
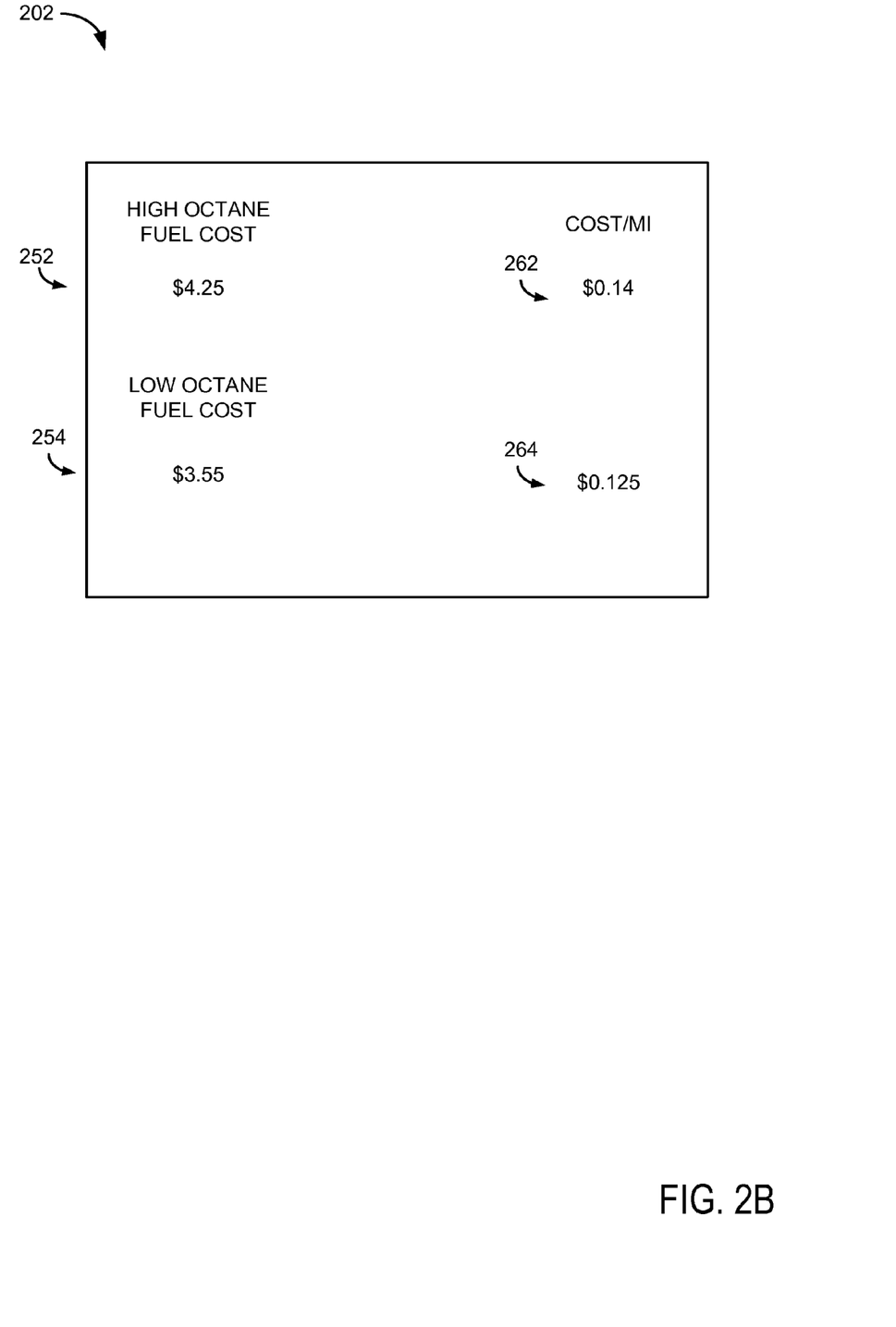
FIG. 2B shows an example display for presenting vehicle fuel options to a vehicle occupant.
Figure 3:
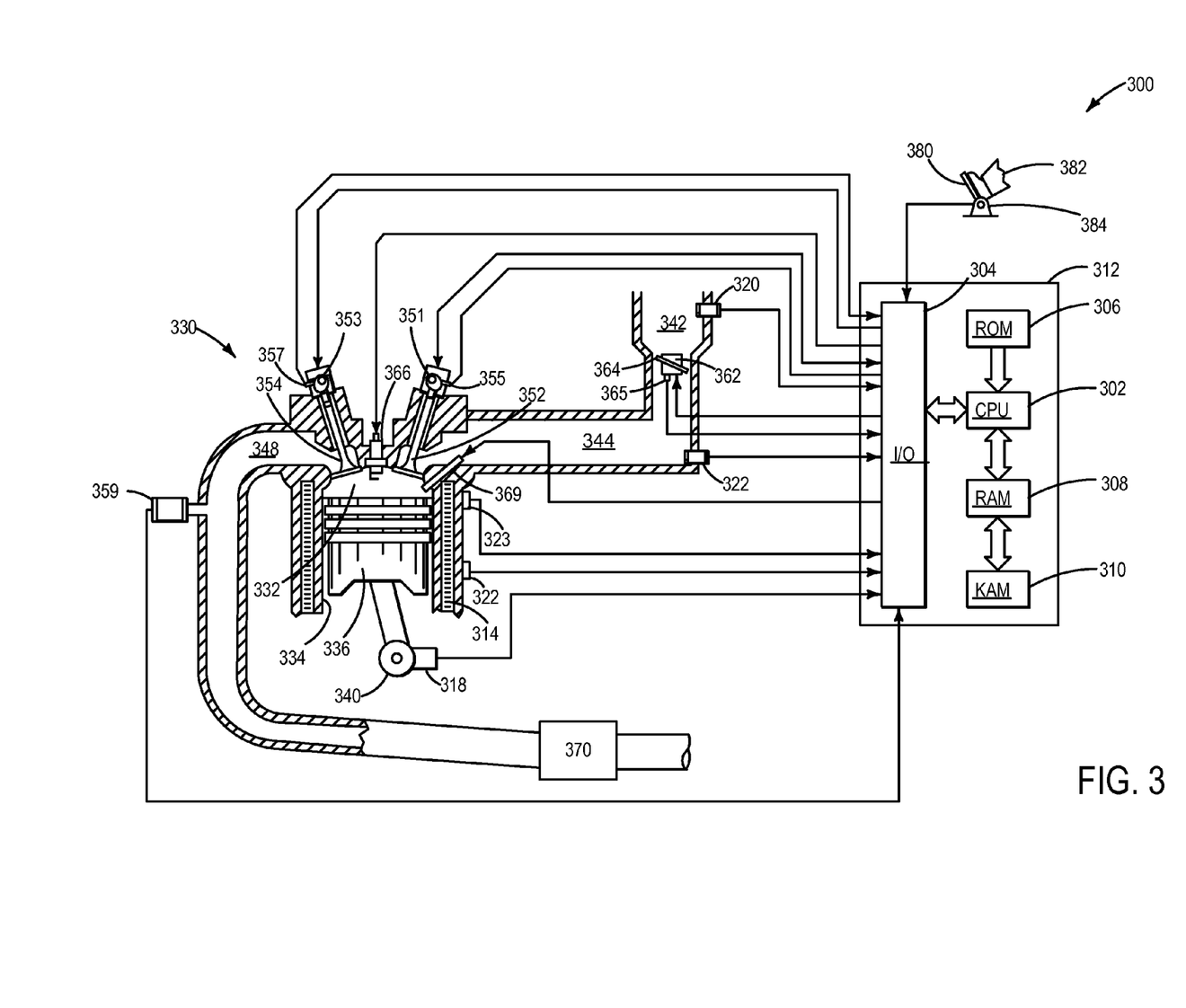
FIG. 3 shows an example engine with a cylinder for the vehicle of FIG. 1.
Figure 4:
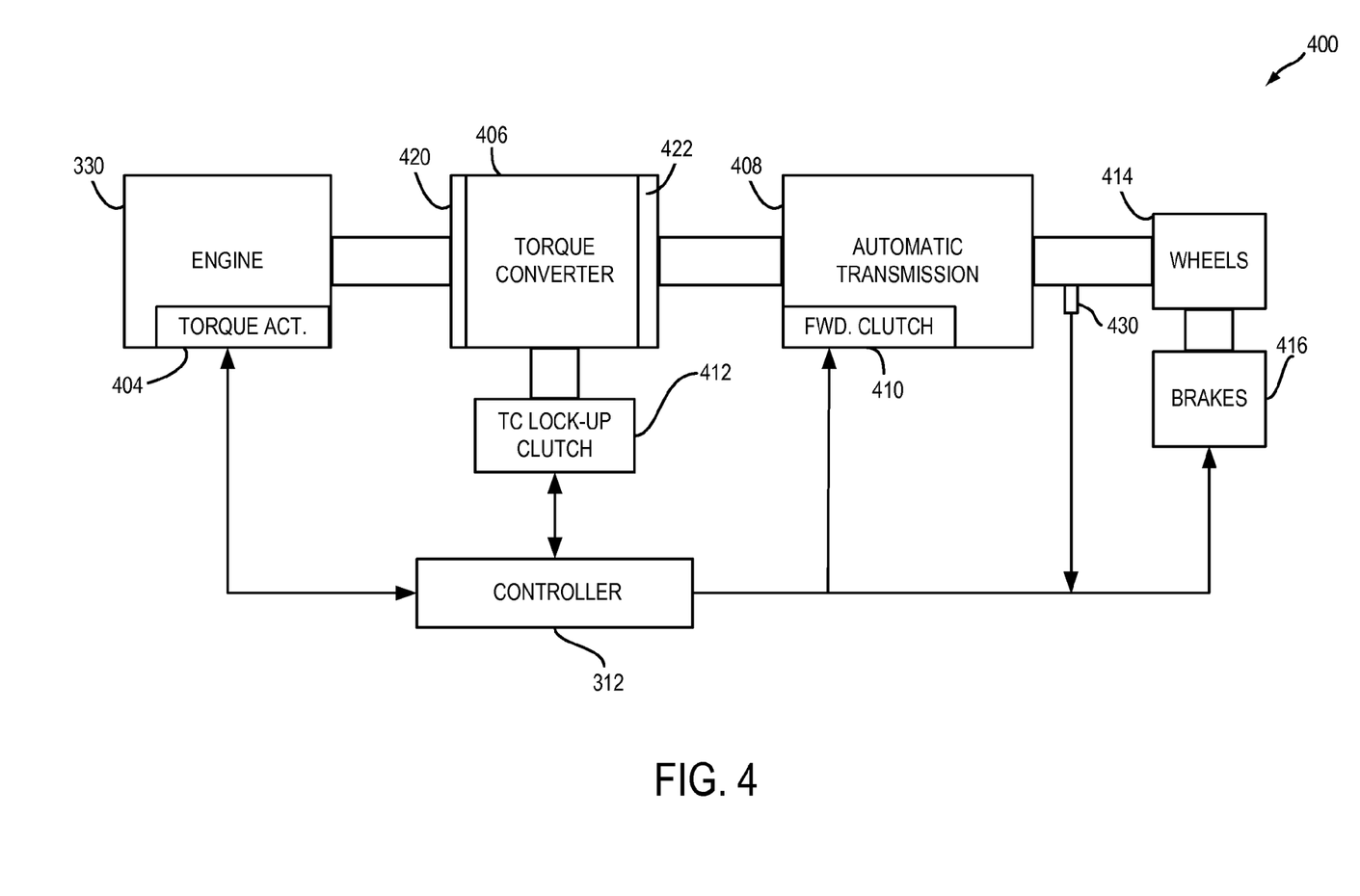
FIG. 4 shows an example driveline for the vehicle of FIG. 1 including the engine of FIG. 3.
Figure 5:
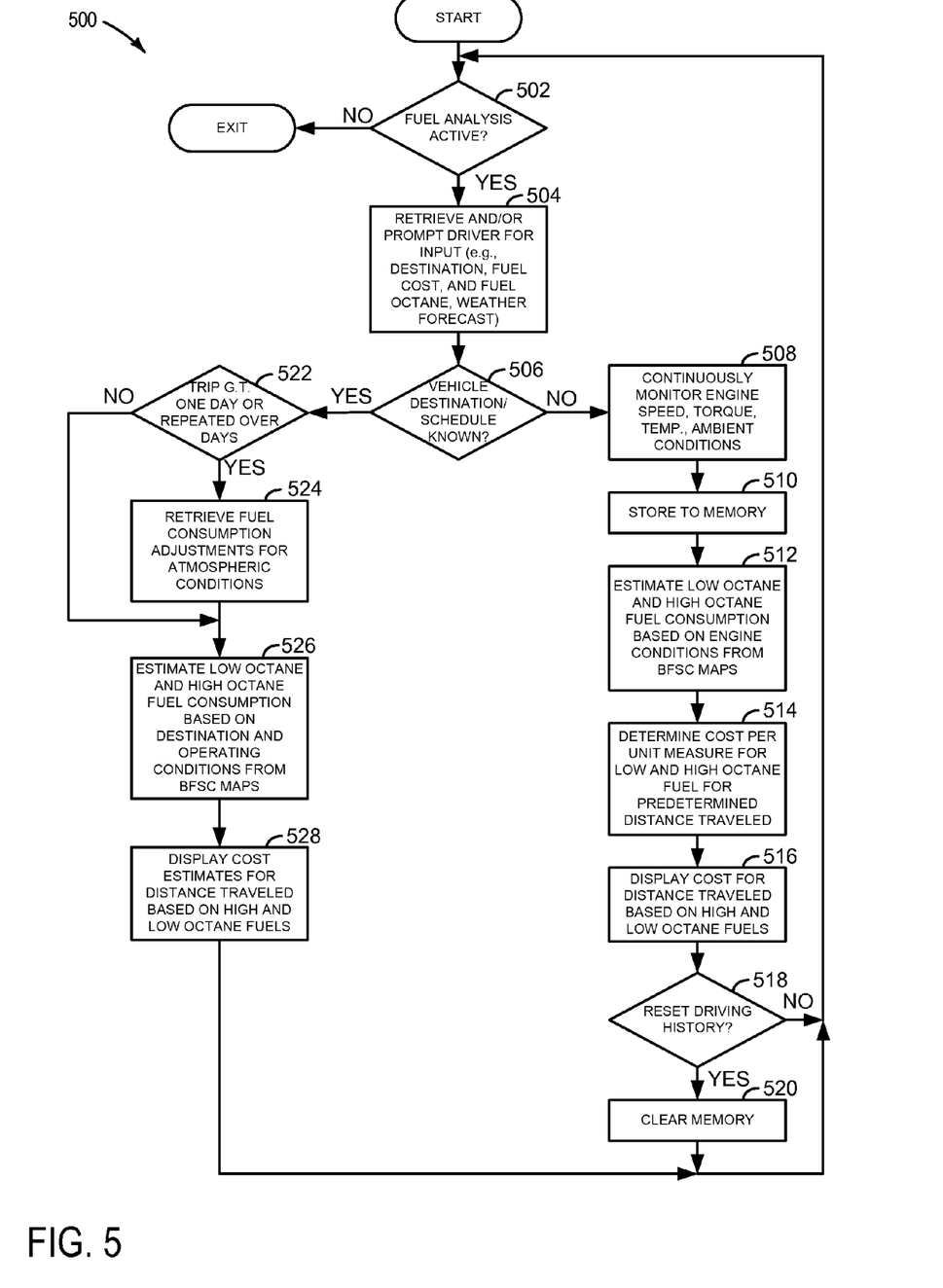
FIG. 5 shows an example method for presenting and selecting vehicle fuel options for fuels having higher or lower octane.
Figure 6:
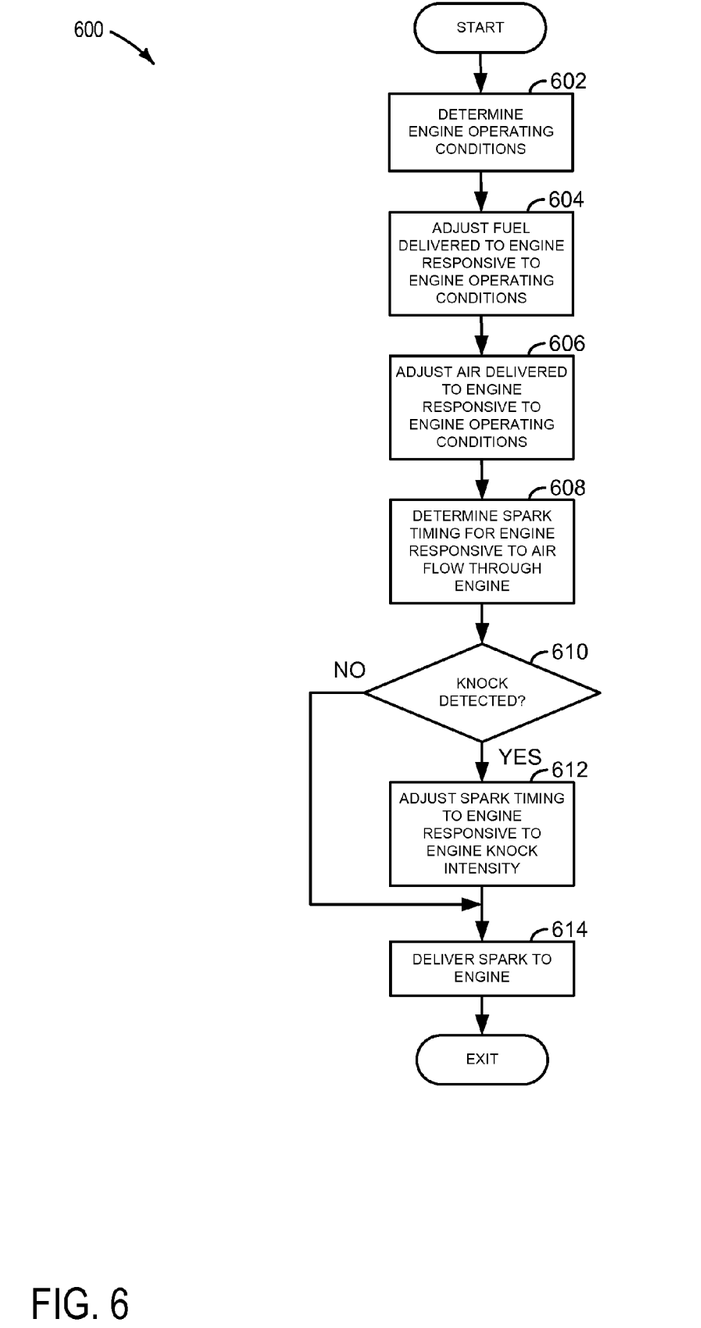
FIG. 6 shows an example method for operating an engine in conjunction with the method of FIG. 5.

The following description relates to systems and methods for presenting options and selecting a fuel having a higher or lower octane based on past or future vehicle travel route. FIG. 1 shows an example vehicle for which costs of operating the vehicle with higher or lower octane fuel over a specified travel route may be estimated. An example display panel for presenting estimated vehicle operating costs is shown in FIGS. 2A and 2B. The vehicle of FIG. 1 may include an engine and driveline as is shown in FIGS. 3 and 4. A method for presenting and selecting vehicle fueling options for fuels having higher or lower octane based on a past or future driving route is shown in FIG. 5. The method of FIG. 5 may be performed via a controller as part of the system shown in FIGS. 1-4. Finally, FIG. 6 shows an example method for operating an engine based on and in concert with the method of FIG. 5.

Referring now to FIG. 1, vehicle 100 includes a transmitter and receiver for sending and receiving data. Vehicle 100 may receive weather information including future weather forecasts from satellite transmitters 102 and/or earthly stationary transmitters 104. Vehicle 100 may also receive and send data to external fuel pump 110 via external fuel pump transmitter/receiver 112. In one example, vehicle 100 may specifically request external fuel pump 110 supply a higher or lower octane fuel in response to an estimated fuel cost to travel a predetermined travel route. External fuel pump 110 may transmit fuel cost and available fuel types (e.g., available fuel octanes, such as 87 octane, 89 octane, and 92 octane) to vehicle 100.

Referring now to FIG. 2A, an example display panel for displaying estimated vehicle operating costs for operating the vehicle with higher and lower octane fuels is shown. Vehicle instrument panel 200 includes vents 208, steering wheel 204, control inputs 210, and display 202. Display 202 may provide vehicle operating cost estimate as shown in FIG. 6 along with other vehicle information such as navigation information and vehicle operating conditions. Display 202 may be in electrical communication with a controller such as controller 312 shown in FIG. 3. Display 202 provides visual information to passenger cabin occupants, and in some examples, it may receive input from vehicle occupants.

Referring now to FIG. 2B, an example display 202 from FIG. 2A is shown. Display 202 may configured to display a high octane fuel cost 252, a low octane fuel cost 254, a cost per unit distance of vehicle travel for operating the vehicle of FIGS. 1-4 with higher octane fuel 262, a cost per unit distance of vehicle travel for operating the vehicle of FIGS. 1-4 with lower octane fuel 264. In other examples, display 202 may provide an estimate of trip cost if the vehicle is operated with higher octane fuel and an estimate of trip cost if the vehicle is operated with lower octane fuel.

Referring now to FIG. 3, a schematic diagram showing one cylinder of a multi-cylinder engine 330 in an engine system 300 is shown. Engine 330 may be controlled at least partially by a control system including a controller 312 and by input from a vehicle operator 382 via an input device 380. In this example, the input device 380 includes an accelerator pedal and a pedal position sensor 384 for generating a proportional pedal position signal.

A combustion chamber 332 of the engine 330 may include a cylinder formed by cylinder walls 334 with a piston 336 positioned therein. The piston 336 may be coupled to a crankshaft 340 so that reciprocating motion of the piston is translated into rotational motion of the crankshaft. The crankshaft 340 may be coupled to at least one drive wheel of a vehicle via an intermediate transmission system. Further, a starter motor may be coupled to the crankshaft 340 via a flywheel to enable a starting operation of the engine 330.

Combustion chamber 332 may receive intake air from an intake manifold 344 via an intake passage 342 and may exhaust combustion gases via an exhaust passage 348. The intake manifold 344 and the exhaust passage 348 can selectively communicate with the combustion chamber 332 via respective intake valve 352 and exhaust valve 354. In some examples, the combustion chamber 332 may include two or more intake valves and/or two or more exhaust valves.

In this example, the intake valve 352 and exhaust valve 354 may be controlled by cam actuation via respective cam actuation systems 351 and 353. The cam actuation systems 351 and 353 may each include one or more cams and may utilize one or more of cam profile switching (CPS), variable cam timing (VCT), variable valve timing (VVT), and/or variable valve lift (VVL) systems that may be operated by the controller 312 to vary valve operation. The position of the intake valve 352 and exhaust valve 354 may be determined by position sensors 355 and 357, respectively. In alternative examples, the intake valve 352 and/or exhaust valve 354 may be controlled by electric valve actuation. For example, the cylinder 332 may alternatively include an intake valve controlled via electric valve actuation and an exhaust valve controlled via cam actuation including CPS and/or VCT systems.

A fuel injector 369 is shown coupled directly to combustion chamber 332 for injecting fuel directly therein in proportion to the pulse width of a signal received from the controller 312. In this manner, the fuel injector 369 provides what is known as direct injection of fuel into the combustion chamber 332. The fuel injector may be mounted in the side of the combustion chamber or in the top of the combustion chamber, for example. Fuel may be delivered to the fuel injector 369 by a fuel system (not shown) including a fuel tank, a fuel pump, and a fuel rail. In some examples, the combustion chamber 332 may alternatively or additionally include a fuel injector arranged in the intake manifold 344 in a configuration that provides what is known as port injection of fuel into the intake port upstream of the combustion chamber 332.

Spark is provided to combustion chamber 332 via spark plug 366. The ignition system may further comprise an ignition coil (not shown) for increasing voltage supplied to spark plug 366. In other examples, such as a diesel, spark plug 366 may be omitted.

The intake passage 342 may include a throttle 362 having a throttle plate 364. In this particular example, the position of throttle plate 364 may be varied by the controller 312 via a signal provided to an electric motor or actuator included with the throttle 362, a configuration that is commonly referred to as electronic throttle control (ETC). In this manner, the throttle 362 may be operated to vary the intake air provided to the combustion chamber 332 among other engine cylinders. The position of the throttle plate 364 may be provided to the controller 312 by a throttle position signal. The intake passage 342 may include a mass air flow sensor 320 and a manifold air pressure sensor 322 for sensing an amount of air entering engine 330.

An exhaust gas sensor 359 is shown coupled to the exhaust passage 348 upstream of an emission control device 370 according to a direction of exhaust flow. The sensor 359 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 359 is a UEGO configured to provide output, such as a voltage signal, that is proportional to the amount of oxygen present in the exhaust. Controller 312 converts oxygen sensor output into exhaust gas air-fuel ratio via an oxygen sensor transfer function.

The emission control device 370 is shown arranged along the exhaust passage 348 downstream of the exhaust gas sensor 359. The device 370 may be a three way catalyst (TWC), $NO_x$ trap, various other emission control devices, or combinations thereof. In some examples, during operation of the engine 330, the emission control device 370 may be periodically reset by operating at least one cylinder of the engine within a particular air-fuel ratio.

The controller 312 is shown in FIG. 3 as a microcomputer, including a microprocessor unit 302, input/output ports 304, an electronic storage medium for executable programs and calibration values shown as read only memory chip 306 (e.g., non-transitory memory) in this particular example, random access memory 308, keep alive memory 310, and a data bus. The controller 312 may receive various signals from sensors coupled to the engine 330, in addition to those signals previously discussed, including measurement of inducted mass air flow (MAF) from the mass air flow sensor 320; engine coolant temperature (ECT) from a temperature sensor 323 coupled to a cooling sleeve 314; a knock sensor 322; an engine position signal from a Hall effect sensor 318 (or other type) sensing a position of crankshaft 340; throttle position from a throttle position sensor 365; and manifold absolute pressure (MAP) signal from the sensor 322. An engine speed signal may be generated by the controller 312 from crankshaft position sensor 318. Manifold pressure signal also provides an indication of vacuum, or pressure, in the intake manifold 344. Note that various combinations of the above sensors may be used, such as a MAF sensor without a MAP sensor, or vice versa. During engine operation, engine torque may be inferred from the output of MAP sensor 322 and engine speed. Further, this sensor, along with the detected engine speed, may be a basis for estimating charge (including air) inducted into the cylinder. In one example, the crankshaft position sensor 318, which is also used as an engine speed sensor, may produce a predetermined number of equally spaced pulses every revolution of the crankshaft.

The storage medium read-only memory 306 can be programmed with computer readable data representing non-transitory instructions executable by the processor 302 for performing the methods described below as well as other variants that are anticipated but not specifically listed.

During operation, each cylinder within engine 330 typically undergoes a four stroke cycle: the cycle includes the intake stroke, compression stroke, expansion stroke, and exhaust stroke. During the intake stroke, generally, the exhaust valve 354 closes and intake valve 352 opens. Air is introduced into combustion chamber 332 via intake manifold 344, and piston 336 moves to the bottom of the cylinder so as to increase the volume within combustion chamber 332. The position at which piston 336 is near the bottom of the cylinder and at the end of its stroke (e.g. when combustion chamber 332 is at its largest volume) is typically referred to by those of skill in the art as bottom dead center (BDC).

During the compression stroke, intake valve 352 and exhaust valve 354 are closed. Piston 336 moves toward the cylinder head so as to compress the air within combustion chamber 332. The point at which piston 336 is at the end of its stroke and closest to the cylinder head (e.g., when combustion chamber 332 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 366, resulting in combustion.

During the expansion stroke, the expanding gases push piston 336 back to BDC. Crankshaft 340 converts piston movement into a rotational torque of the rotary shaft. Finally, during the exhaust stroke, the exhaust valve 354 opens to release the combusted air-fuel mixture to exhaust manifold 348 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 3 shows only one cylinder of a multi-cylinder engine, and each cylinder may similarly include its own set of intake/exhaust valves, fuel injector, spark plug, etc.

Referring now to FIG. 4, a schematic of a vehicle drive-train 400 is shown. Drive-train 400 may be powered by engine 330. In one example, engine 330 may be a gasoline engine. In alternate examples, other engine configurations may be employed, for example, a diesel engine. Engine 330 may be started with an engine starting system (not shown). Further, engine 330 may generate or adjust torque via torque actuator 404, such as a fuel injector, throttle, etc.

An engine output torque may be transmitted to torque converter 406 to drive an automatic transmission 408 by engaging one or more clutches, including forward clutch 410, where the torque converter may be referred to as a component of the transmission. Torque converter 406 includes an impeller 420 that transmits torque to turbine 422 via hydraulic fluid. One or more clutches may be engaged to change mechanical advantage between the engine vehicle wheels 414. The output of the torque converter 406 may in turn be controlled by torque converter lock-up clutch 412. As such, when torque converter lock-up clutch 412 is fully disengaged, torque converter 406 transmits torque to automatic transmission 408 via fluid transfer between the torque converter turbine 422 and torque converter impeller 420, thereby enabling torque multiplication. In contrast, when torque converter lock-up clutch 412 is fully engaged, the engine output torque is directly transferred via the torque converter clutch 412 to an input shaft (not shown) of transmission 408. Alternatively, the torque converter lock-up clutch 412 may be partially engaged, thereby enabling the amount of torque relayed to the transmission to be adjusted. A controller 312 may be configured to adjust the amount of torque transmitted by the torque converter by adjusting the torque converter lock-up clutch in response to various engine operating conditions, or based on a driver-based engine operation request.

Torque output from the automatic transmission 408 may in turn be relayed to wheels 414 to propel the vehicle. Specifically, automatic transmission 408 may adjust an input driving torque at the input shaft (not shown) responsive to a vehicle traveling condition before transmitting an output driving torque to the wheels. Vehicle speed may be determined via speed sensor 430.

Further, wheels 414 may be locked by engaging wheel brakes 416. In one example, wheel brakes 416 may be engaged in response to the driver pressing his foot on a brake pedal (not shown). In the similar way, wheels 414 may be unlocked by disengaging wheel brakes 416 in response to the driver releasing his foot from the brake pedal.

A mechanical oil pump (not shown) may be in fluid communication with automatic transmission 408 to provide hydraulic pressure to engage various clutches, such as forward clutch 410 and/or torque converter lock-up clutch 412. The mechanical oil pump may be operated in accordance with torque converter 406, and may be driven by the rotation of the engine or transmission input shaft, for example. Thus, the hydraulic pressure generated in mechanical oil pump may increase as an engine speed increases, and may decrease as an engine speed decreases.

Thus, the system of FIGS. 1-4 provides for a vehicle system, comprising: a vehicle; and a controller in the vehicle including non-transitory instructions for at a substantially same time, estimating a cost per unit distance traveled by the vehicle for a higher octane fuel and a lower octane fuel based on a future vehicle travel route, and instructions for displaying at a same time the cost per unit distance for the vehicle travel route for the higher octane fuel and the lower octane fuel. The system includes where the future vehicle travel route is based on a present position of the vehicle and a vehicle destination input by a vehicle occupant. The system includes where the future vehicle travel route is based on a travel route stored in controller memory. The system includes where the travel route stored in controller memory is comprised of engine speed values and engine torque values acquired along the future vehicle travel route. The system includes where cost per unit distance traveled is based on an engine brake specific fuel consumption function. The system includes where the cost per unit traveled is further based on a future weather forecast.

Referring now to FIG. 5, a method for selecting a fuel having a higher or lower octane is shown. At least portions of the method of FIG. 5 may be incorporated as executable instructions stored in non-transitory memory of controller 312 shown in FIG. 3. Further, portions of the method of FIG. 5 may be performed via inputs and outputs of controller 312 operating on devices external to the controller and within the system and scope of devices described herein.

At 502, method 500 judges whether or not fuel analysis is active or desired. In one example, fuel analysis may be desired if a driver wishes to determine if it would be more economical to operate the vehicle with higher or lower octane fuel. The driver may specifically request fuel analysis. In other examples, fuel analysis may be activated in response to entering a fuel filling station as determined via a filling station radio frequency signal or a global positioning system. Method 500 proceeds to 504 if it is judged fuel analysis is desired. Otherwise, method 500 proceeds to exit.

At 504, method 500 retrieves and/or prompts a vehicle occupant for input. Method 500 may prompt a vehicle occupant for fuel types available (e.g., fuel octane levels available) and fuel cost per unit volume (e.g., $4.00 per gallon of 93 octane, $3.75 per gallon 87 octane). Method 500 may also prompt a vehicle occupant for a vehicle destination and a desired performance level (e.g., high performance or lower performance).

Method 500 may also retrieve data from memory or sources external to the vehicle. For example, method 500 may retrieve data from a previous driving route from memory. The data from the previous driving route may include but is not limited to engine speeds and torques produced during the driving route. Further, the amount of time the engine and/vehicle operated at the engine speeds and torques may be retrieved from memory. In some examples, method 500 may retrieve available fuel information (e.g., available fuel octanes and fuel costs) from fuel filling stations or fuel pumps. In one example, method 500 retrieves fuel information in response to a radio frequency signal emitted by a fuel pump or filling station. In other examples, method 500 may send a radio frequency signal to a fuel filling station or pump requesting the fuel information based on global positioning information from a global positioning system. Method 500 may also retrieve current weather conditions and forecasts for future weather if radio frequency sources such as a satellite, cellular tower, and/or broadcast node. The weather information may include present and expected humidity levels along with present and expected barometric pressures. The weather information may also include present and expected hourly temperatures. The retrieved weather information may be pertinent for a predetermined number of days in the future (e.g., seven day forecast). Method 500 proceeds to 506 after receiving vehicle occupant input and information or data from external sources or memory.

At 506, method 500 judges if the vehicle destination is known. The vehicle destination may be known if a driver inputs a vehicle destination or if the vehicle is being driven on a frequently taken route stored to memory (e.g., a route to a driver's employer, store, or recreation destination). If the vehicle destination is known, the answer is yes and method 500 proceeds to 522. Otherwise, the answer is no and method 500 proceeds to 508.

At 508, method 500 continuously monitors vehicle operating conditions during a travel route. In one example, method 500 samples and monitors engine speed, engine torque, and time the engine operates at individual engine speed and engine torque conditions to memory. Further, method 500 may sample and monitor ambient temperature, distance traveled, barometric pressure, and ambient humidity levels to memory. The data may be sampled at a predetermined rate (e.g., once per second). Method 500 proceeds to 510 after beginning to sample desired vehicle information.

At 510, method 500 stores the data sampled at 508 to memory. The data may be stored at predetermined time intervals (e.g., every second). In some examples, the data may be averaged over a predetermined amount of time and stored to memory. Further, the data is stored into a record or file for the specific route traveled. Data for a plurality of travel routes may be stored to memory. Method 500 proceeds to 512 after data is stored to memory.

At 512, method 500 estimates an amount of high octane fuel and an amount of low octane fuel that the vehicle would consume to drive a stored travel route, such as the route the vehicle is presently traveling. The stored travel route may be based on data sampled and stored at 508 and 510. In one example, method 500 estimates an amount of high octane fuel that would be consumed by the vehicle based on the stored engine speeds, engine torques, and time operating at the speeds and torque. In particular, engine speeds and torque index tables or functions that hold empirically determined values of the engine's brake specific fuel consumption. The engine's fuel consumption may be expressed in units of volume per unit time (e.g., gallons per hour). Thus, for selected engine speeds and torques, the table or function outputs a rate the engine consumes the higher octane fuel. The table output is multiplied by the amount of time the engine operates at the selected engine speeds and torques to determine an amount of fuel consumed. For example, if an engine is driven on a travel route where engine speed is constant at 2000 RPM and torque is constant at 75 N-m for a period of 1 hour, the BFSC table may output a value to indicate 1.5 gallons per hour of high octane fuel would be consumed. As a result, the amount of fuel consumed by the engine over the driving route would be 1.5 gallons of fuel or 1.5·1=1.5. If the engine speed and torque vary over the driving route, fuel consumed over a number of smaller time intervals is summed to determine the amount of fuel the vehicle and engine is estimated to consume. A similar estimate for lower octane fuel is also provided based on a BSFC function or table for when the engine is operated with the lower octane fuel.

The engine fuel consumption estimates are also adjusted for ambient temperature, barometric pressure, and humidity. In one example, multipliers for barometric pressure, ambient temperature, and humidity are retrieved from memory and are multiplied with values output from the higher octane BFSC table or function and values output from the lower BFSC table or function. Further, an additional multiplier to compensate for aerodynamics of driving the vehicle at higher or lower ambient temperatures are multiplied with values output from the higher octane BFSC table or function and values output from the lower octane BFSC table or function. In this way, vehicle fuel consumption estimates are adjusted for ambient vehicle operating conditions. Method 500 proceeds to 514 after the estimates of the amounts of higher and lower octane fuels to operate the vehicle over the travel route are determined.

In addition, in some examples, method 500 may estimate if the engine is expected to knock over the travel route when operated on lower and higher octane fuels. In one example, a table or function describing possibility of engine knock when operating the engine with higher octane fuel is indexed via engine speeds, engine torques, and amount of times operating at the engine speeds and torques. The table or function outputs a value of one if engine knock is expected and a value of zero if engine knock is not expected. If knock is estimated to occur over the travel route, a bit in memory may be set to notify the driver knock over the travel route is expected if the engine is operated with higher octane fuel. Likewise, travel route data (e.g., engine speed, engine torque, amount of time operating at the engine speeds and torques) for operating the engine with lower octane fuel is used to index a table or function describing the possibility of engine knock when operating the engine with lower octane fuel. The table or function outputs a value of one if engine knock is expected and a value of zero if engine knock is not expected. If knock is estimated to occur over the travel route, a bit in memory may be set to notify the driver knock over the travel route is expected if the engine is operated with lower octane fuel.

At 514, method 500 estimates costs per unit distance traveled for the vehicle when the vehicle is operated with higher octane fuel and lower octane fuel over the stored travel route. The cost for unit distance for the vehicle when the vehicle is operated with higher octane fuel is determined via multiplying the estimated amount of higher octane fuel to travel the route (e.g., X gallons) by the fuel cost per unit volume (e.g., $4.00 per gallon). The result is divided by the distance of the travel route to determine the higher octane fuel cost per unit distance traveled. The lower octane fuel cost per unit distance traveled is determined in a similar way. Method 500 proceeds to 516 after the costs per unit distance traveled for operating the vehicle with higher and lower octane fuels is determined.

At 516, method 500 displays cost estimates per unit distance (e.g., $0.09 per mile driven for higher octane fuel and $0.12 per mile driven for lower octane fuel) for operating the vehicle over the travel route with the lower and higher octane fuels. In one example, the costs are displayed on an information display 202 as shown in FIGS. 2 and 6. The displayed information allows a driver to make an informed decision as to whether to select higher octane fuel or lower octane fuel. Additionally, the display may notify the driver if knock is estimated to occur over the travel route if the engine is operated with higher or lower octane fuel based on the bits stored in memory at 512.

In some examples, method 500 may also select a fuel to operate the vehicle with based on cost estimates to operate the vehicle with higher or lower octane fuel and whether or not knock is estimate to occur over the travel route when the vehicle is operated with higher and lower octane fuels. For example, if knock indication bits for the vehicle operating with higher and lower octane fuels contain values of zero, and cost of operating the vehicle with lower octane fuel per unit distance traveled is lower, method 500 selects the vehicle to operate with lower octane fuel. The fuel selection may be transmitted to a fuel filling station and/or pump via radio frequency so that the fuel filling station pumps low octane fuel to the vehicle. Method 500 proceeds to 518 after displaying and/or transmitting fuel costs to operate the vehicle.

At 518, method 500 judges whether or not a vehicle passenger has requested to reset or clear one or more vehicle travel routes from memory. If so, the answer is yes and method 500 proceeds to 520. Otherwise, the answer is no and method 500 returns to 502.

At 520, method 500 fills selected memory locations for one or more vehicle travel routes with values of zero. Further, method 500 may zero fuel costs per unit volume entered by the driver or received from a fuel pump and/or filling station. Method 500 returns to 502 after resetting selected variables in memory.

In this way, method 500 may estimate vehicle operating costs for a vehicle travel route as the vehicle travels to an unknown destination. Vehicle operating expenses may be estimated for an operating the vehicle with a higher octane fuel when the vehicle is actually operating with a lower octane fuel and vice-versa.

At 522, method 500 judges if the route will be traveled over greater than (G.T.) one day or if the route will be repeated over a number of days. On example of a trip that may be repeated over a number of days is a trip to the driver's place of business or job. A travel route across country may be judged to be greater than a one day trip. Method 500 may make an enquiry to a driver to determine if a trip is to be repeated. Method 500 may judge that a travel route will require more than a day of driving if the travel route is greater than a predetermined distance. If method 500 judges that the travel route will be repeated or traveled over more than one day, the answer is yes and method 500 proceeds to 524. Otherwise, the answer is no and method 500 proceeds to 526.

At 524, method 500 retrieves adjustment factors for engine fuel consumption based on atmospheric conditions. For example, method 500 may retrieve empirically determined variables that when multiplied by output from BFSC tables or functions adjust estimated engine fuel consumption based on humidity, ambient temperature, and ambient pressure. Variables are retrieved for each day the travel route is expected to be taken. For example, if the vehicle is expected to travel a same route Monday through Friday, variables for adjusting output of the high octane BSFC table or function and output of the lower octane BSFC table are retrieved based on humidity, temperature, and barometric pressure for the route the vehicle is expected to travel Monday through Friday. Thus, there may be five or more humidity adjustment variables, five or more temperature adjustment variables, and five or more barometric pressure adjustment variables. For increasing ambient humidity, the humidity adjustment variables may decrease BFSC function output values since higher humidity may allow for additional spark advance. For decreasing ambient humidity, the humidity adjustment variables may increase BFSC function output values since the engine may tend to knock at lower humidity levels. Similarly, for decreased ambient temperature, the ambient temperature adjustment variables may decrease BFSC function output values since the lower ambient temperature may allow for additional spark advance. For increased ambient temperature, the ambient temperature adjustment variables may increase BFSC function output values since higher ambient temperature may cause engine knock. Additionally, adjustment factors for vehicle mass including towed trailers may be provided to adjust output from lower octane and higher octane BFSC tables.

If the vehicle is expected to travel more than one day, ambient humidity, ambient temperature, and barometric pressure values for each day for locations along the travel route are retrieved. Method 500 retrieves empirically determined variables that when multiplied by output from BFSC tables or functions adjust estimated engine fuel consumption based on humidity, ambient temperature, and ambient pressure for the days and locations along the travel route. Method 500 proceeds to 526 after the empirically determined variables to compensate BFSC for ambient humidity, ambient pressure, and ambient temperature are retrieved.

At 526, method 500 estimates an amount of high octane fuel and an amount of low octane fuel that the vehicle would consume to drive a known travel route. The known travel may be based on the vehicle's starting location and destination. Vehicle data (e.g., engine speed, engine torque, and time traveling at particular engine speeds and torques) for the known travel route may not be stored in memory. Rather, travel route data may be retrieved from a navigation database and engine operating conditions may be estimated based on information retrieved from the navigation database. For example, if a desired travel route is over a highway with a 70 miles per hour speed limit, zero grade, and having a length of 5 miles, method 500 may estimate that the vehicle will operate at an engine speed of X RPM, an engine torque of Y N-m, and a travel time of just over 7 minutes. The engine speed and torque estimates are based on a gear the vehicle's transmission is expected to operate in based on a transmission shift schedule and the vehicle speed limit for the travel route. The transmission shift schedule output is a transmission gear. The engine speed and torque are determined based on vehicle road load including grade, selected transmission gear, and vehicle speed. Engine speeds, engine torques, and time operating at the engine speeds and torques are estimated for the known vehicle travel route.

Method 500 estimates an amount of high octane fuel that would be consumed by the vehicle based on the estimated engine speeds, engine torques, and time operating at the speeds and torque for the known travel route. Specifically, estimated engine speeds and torque index tables or functions that hold empirically determined values of the engine's brake specific fuel consumption. The engine's fuel consumption may be expressed in units of volume per unit time (e.g., gallons per hour). Thus, for selected engine speeds and torques, the table or function outputs a rate the engine consumes the higher octane fuel. The table output is multiplied by the amount of time the engine operates at the selected engine speeds and torques to determine an amount of fuel consumed. If the engine speed and torque vary over the driving route, fuel consumed over a number of smaller time intervals is summed to determine the amount of fuel the vehicle and engine is estimated to consume. A similar estimate for lower octane fuel is also provided based on a BSFC function or table for when the engine is operated with the lower octane fuel.

The engine fuel consumption estimates are also adjusted for ambient temperature, barometric pressure, and humidity based on the adjustment factors retrieved at 524. In one example, the adjustment factors or parameters are retrieved from memory and are multiplied with values output from the higher octane BFSC table or function and values output from the lower BFSC table or function. Further, an additional multiplier to compensate for aerodynamics of driving the vehicle at higher or lower ambient temperatures are multiplied with values output from the higher octane BFSC table or function and values output from the lower octane BFSC table or function. In this way, vehicle fuel consumption estimates for the known destination are adjusted for ambient vehicle operating conditions. Method 500 proceeds to 528 after the estimates of the amounts of higher and lower octane fuels to operate the vehicle over the travel route are determined.

In addition, in some examples, method 500 may estimate if the engine is expected to knock over the travel route when operated on lower and higher octane fuels. In one example, a table or function describing possibility of engine knock when operating the engine with higher octane fuel is indexed via engine speeds, engine torques, and amount of times operating at the engine speeds and torques. The table or function outputs a value of one if engine knock is expected and a value of zero if engine knock is not expected. If knock is estimated to occur over the travel route, a bit in memory may be set to notify the driver knock over the travel route is expected if the engine is operated with higher octane fuel. Likewise, travel route data (e.g., engine speed, engine torque, amount of time operating at the engine speeds and torques) for operating the engine with lower octane fuel is used to index a table or function describing the possibility of engine knock when operating the engine with lower octane fuel. The table or function outputs a value of one if engine knock is expected and a value of zero if engine knock is not expected. If knock is estimated to occur over the travel route, a bit in memory may be set to notify the driver knock over the travel route is expected if the engine is operated with lower octane fuel.

At 528, method 500 displays cost estimates per unit distance (e.g., $0.09 per mile driven for higher octane fuel and $0.12 per mile driven for lower octane fuel) for operating the vehicle over the travel route with the lower and higher octane fuels. In one example, the costs are displayed on an information display 202 as shown in FIGS. 2 and 6. The displayed information allows a driver to make an informed decision as to whether to select higher octane fuel or lower octane fuel. Additionally, the display may notify the driver if knock is estimated to occur over the travel route if the engine is operated with higher or lower octane fuel based on the bits stored in memory at 526.

In some examples, method 500 may also select a fuel to operate the vehicle with based on cost estimates to operate the vehicle with higher or lower octane fuel and whether or not knock is estimate to occur over the travel route when the vehicle is operated with higher and lower octane fuels. For example, if knock indication bits for the vehicle operating with higher and lower octane fuels contain values of zero, and cost of operating the vehicle with lower octane fuel per unit distance traveled is lower, method 500 selects the vehicle to operate with lower octane fuel. The fuel selection may be transmitted to a fuel filling station and/or pump via radio frequency so that the fuel filling station pumps low octane fuel to the vehicle. Method 500 returns to 502 after displaying and/or transmitting fuel costs to operate the vehicle.

In this way, method 500 may estimate an amount of higher and lower octane fuel to travel a known travel route. The estimate may compensate for ambient humidity, pressure, and temperature.

Thus, the method of FIG. 5 provides for a vehicle method, comprising: retrieving engine operating information from sensors; at a substantially same time (e.g., within a few seconds), estimating cost per unit distance traveled via a vehicle for a higher octane fuel and a lower octane fuel based on the engine operating information; and displaying cost per unit distance traveled by the vehicle for the higher octane fuel and the lower octane fuel at a same time. The method includes where the engine operating information is engine speed and torque. The method further comprises estimating the cost per unit distance traveled by the vehicle for the higher octane fuel based on an engine brake specific fuel consumption function for the higher octane fuel. The method further comprises estimating the cost per unit distance traveled by the vehicle for the lower octane fuel based on an engine brake specific fuel consumption function for the lower octane fuel.

In some examples, the method includes where the engine brake specific fuel consumption function is adjusted for weather conditions. The method includes where the cost per unit distance traveled by the vehicle for the higher octane fuel is based on a cost of the higher octane fuel input to a controller via a driver or a fuel pump transmitter.

The method of FIG. 5 also provides for a vehicle method, comprising: retrieving engine operating information from sensors; at a substantially same time, estimating cost per unit distance traveled via a vehicle for a higher octane fuel and a lower octane fuel based on the engine operating information; and supplying fuel to the vehicle from a fuel pump external of the vehicle in response to the cost per unit distance traveled for the higher octane fuel and the lower octane fuel. The method includes where a controller in the vehicle communicates a fuel type to the fuel pump external of the vehicle. The method includes where the fuel pump external of the vehicle supplies the fuel type to the vehicle, by transmitting via a radio frequency for example. The method further comprises estimating cost per unit distance traveled by the vehicle for the lower octane fuel based on an engine brake specific fuel consumption function for the lower octane fuel.

In some examples, the method includes where a driver selects a fuel to supply to the vehicle. The method includes where the higher octane fuel is selected when the cost per unit distance traveled for the higher octane fuel is lower. The method includes where the lower octane fuel is selected when the cost per unit distance traveled for the lower octane fuel is lower. The method further comprises retrieving future weather information from an external source and adjusting the cost per unit distance traveled in response to the future weather information.

Referring now to FIG. 6, a method for selecting a fuel having a higher or lower octane is shown. At least portions of the method of FIG. 6 may be incorporated as executable instructions stored in non-transitory memory of controller 312 shown in FIG. 3. Further, portions of the method of FIG. 6 may be performed via inputs and outputs of controller 312 operating on devices external to the controller and within the system and scope of devices described herein. The method of FIG. 6 is performed in conjunction with the method of FIG. 5 and while the method of FIG. 5 is executing. Further, information may be exchanged between the method of FIG. 5 and the method of FIG. 6 in some examples.

At 602, method 600 determines engine operating conditions. Engine operating conditions may be determined via receiving inputs from sensors and actuators shown in FIGS. 1-4. Engine operating conditions may include but are not limited to engine speed, air flow through the engine, engine temperature, driver demand torque as indicated from an accelerator pedal or other source, ambient air temperature, ambient air pressure, ambient humidity, engine knock, and vehicle speed. Method 600 proceeds to 604 after engine operating conditions are determined.

At 604, method 600 adjusts an amount of fuel supplied to the engine. The amount of fuel supplied to the engine is adjusted via adjusting the amount of time fuel injectors are opened via adjusting fuel injector pulse widths. In one example, driver demand torque and engine speed index a table or function that outputs a desired driver demand torque. The driver demand torque indexes a table holding empirically determined fuel amounts for when the engine is operated at stoichiometric conditions. The table outputs a fuel amount and the fuel amount or mass that is converted into a fuel injector pulse width which is output to the one or more fuel injectors. The fuel amount may be richened or made leaner responsive to engine temperature and other operating conditions. The fuel amount or mass may be an amount supplied to an individual cylinder of the engine and each engine cylinder may receive a similar amount of fuel. Method 600 proceeds to 606 after the amount of fuel supplied to the engine is determined and output.

At 606, method 600 adjusts an amount of air supplied to the engine. The amount of air supplied to the engine is adjusted via adjusting engine throttle position and engine valve timing. In one example, a desired engine air-fuel ratio is determined based on engine operating conditions. The desired air-fuel ratio is multiplied by the fuel mass determined at 604 to determine a desired amount of air in a cylinder for a combustion event. The throttle and cam valve timing are adjusted to provide the desired amount of air in the cylinder. Method 600 proceeds to 608 after the engine air amount is adjusted.

At 608, method 600 determines engine spark timing based on the air amount in engine cylinders and engine speed. In one example, empirically determined values of spark are stored in a table or function that is indexed via engine speed and cylinder air amount, the table outputs a spark timing. The spark timing may be based on a nominal octane fuel (e.g., 90 octane fuel). Alternatively, multiple spark tables or functions may be provided for different octane fuels. The particular table used to determine spark timing is based on the octane of fuel supplied to the engine. Method 600 proceeds to 610 after spark engine spark timing.

At 610, method 600 determines whether or not engine knock is present. In one example, engine knock may be determined via an engine knock sensor or accelerometer. Output from the knock sensor is received by the controller. If method 600 judges that engine knock is present, the answer is yes and method 600 proceeds to 612. Otherwise, the answer is no and method 600 proceeds to 614. Engine spark timing may be at least partially dependent on fuel octane. In particular, higher octane fuels may allow for increased spark timing to increase engine torque and efficiency. Lower octane fuels may necessitate retarded spark timings to reduce the possibility of engine knock.

At 612, method 600 adjusts the spark timing determined at 608 in response to engine knock intensity. Engine knock intensity may be determined via integrating knock sensor output and determining the integrated value. If knock is detected, engine spark timing may be retarded to reduce engine knock intensity. Method 600 proceeds to 614 after the engine spark timing is adjusted responsive to engine knock.

At 614, method 600 delivers spark to engine cylinders at the spark timing determined at 608 or 612. If engine knock is indicated, spark timing is retarded and output at timing determined at 612. Spark is provided to engine cylinders via an ignition coil and spark plugs. Method 600 proceeds to exit after spark is output to the engine.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle method, comprising:
   retrieving engine operating information from sensors;
   at a substantially same time, estimating cost per unit distance traveled via a vehicle for a higher octane fuel and a lower octane fuel based on the engine operating information and present and future weather conditions; and
   displaying the cost per unit distance traveled by the vehicle for the higher octane fuel and the lower octane fuel at a same time.

2. The method of claim 1, where the engine operating information is engine speed and torque.

3. The method of claim 1, further comprising estimating the cost per unit distance traveled by the vehicle for the higher octane fuel based on an engine brake specific fuel consumption function for the higher octane fuel.

4. The method of claim 1, further comprising estimating the cost per unit distance traveled by the vehicle for the lower octane fuel based on an engine brake specific fuel consumption function for the lower octane fuel, and wherein weather information includes present and expected humidity levels and present and expected barometric pressures, the weather information determined to be pertinent for a predetermined number of days in the future.

5. The method of claim 4, where the engine brake specific fuel consumption function is adjusted for weather conditions.

6. The method of claim 1, where the cost per unit distance traveled by the vehicle for the higher octane fuel is based on a cost of the higher octane fuel input to a controller via a driver or a fuel pump transmitter.

7. A vehicle method, comprising:
   retrieving engine operating information from sensors;
   retrieving future weather information from an external source;
   at a substantially same time, estimating cost per unit distance traveled via a vehicle for a higher octane fuel and a lower octane fuel based on the engine operating information;
   adjusting the cost per unit distance traveled in response to the future weather information; and
   supplying fuel to the vehicle from a fuel pump external of the vehicle in response to the adjusted cost per unit distance traveled for the higher octane fuel and the lower octane fuel.

8. The method of claim 7, where a controller in the vehicle communicates a fuel type to the fuel pump external of the vehicle.

9. The method of claim 8, where the fuel pump external of the vehicle supplies the fuel type to the vehicle.

10. The method of claim 7, further comprising estimating cost per unit distance traveled by the vehicle for the lower octane fuel based on an engine brake specific fuel consumption function for the lower octane fuel, where the engine brake specific fuel consumption function is adjusted for weather conditions.

11. The method of claim 7, where a driver selects a fuel to supply to the vehicle.

12. The method of claim 7, where the higher octane fuel is selected when the cost per unit distance traveled for the higher octane fuel is lower.

13. The method of claim 7, where the lower octane fuel is selected when the cost per unit distance traveled for the lower octane fuel is lower.

14. The method of claim 7, wherein weather information includes present and expected humidity levels along with present and expected barometric pressures.

15. A vehicle system, comprising:
   a vehicle; and
   a controller in the vehicle including non-transitory instructions for at a substantially same time, estimating a cost per unit distance traveled by the vehicle for a higher octane fuel and a lower octane fuel based on a future vehicle travel route, and instructions for displaying at a same time the cost per unit distance traveled for the future vehicle travel route for the higher octane fuel and the lower octane fuel, where the cost per unit distance traveled is further based on a future weather forecast.

16. The system of claim 15, where the future vehicle travel route is based on a present position of the vehicle and a vehicle destination input by a vehicle occupant.

17. The system of claim 15, where the future vehicle travel route is based on a travel route stored in controller memory.

18. The system of claim 17, where the travel route stored in controller memory is comprised of engine speed values and engine torque values acquired along the future vehicle travel route.

19. The system of claim 15, where the cost per unit distance traveled is based on an engine brake specific fuel consumption function, where the engine brake specific fuel consumption function is adjusted for weather conditions.

20. The system of claim 15, where the controller instructions include instructions to estimate the cost per unit distance traveled for the future vehicle travel route of the higher and lower octane fuels differently depending on whether a vehicle schedule is known.

* * * * *